United States Patent
Laursen et al.

(10) Patent No.: US 8,958,338 B2
(45) Date of Patent: Feb. 17, 2015

(54) CELL FOR SELF-CONFIGURING WIRELESS COMMUNICATION NETWORK

(75) Inventors: Morten Laursen, Nørresundby (DK); Jens Toftgaard Petersen, Aalborg (DK)

(73) Assignee: RTX A/S, Norresundby (DK)

( * ) Notice: Subject to any disclaimer, the term of this patent is extended or adjusted under 35 U.S.C. 154(b) by 897 days.

(21) Appl. No.: 13/139,597

(22) PCT Filed: Dec. 17, 2009

(86) PCT No.: PCT/DK2009/050342
§ 371 (c)(1),
(2), (4) Date: Sep. 9, 2011

(87) PCT Pub. No.: WO2010/069332
PCT Pub. Date: Jun. 24, 2010

(65) Prior Publication Data
US 2011/0310754 A1 Dec. 22, 2011

(30) Foreign Application Priority Data

Dec. 19, 2008 (EP) ..................................... 08172293

(51) Int. Cl.
*H04L 12/28* (2006.01)
*H04J 3/06* (2006.01)
(Continued)

(52) U.S. Cl.
CPC .............. *H04J 3/0641* (2013.01); *H04W 84/18* (2013.01); *H04J 3/0688* (2013.01); *H04L 41/044* (2013.01); *H04L 41/12* (2013.01); *H04W 84/20* (2013.01)
USPC ........ 370/254; 370/350; 370/503; 455/435.2; 455/502

(58) Field of Classification Search
None
See application file for complete search history.

(56) References Cited

U.S. PATENT DOCUMENTS 6,594,273 B1   7/2003  McGibney
(Continued)

FOREIGN PATENT DOCUMENTS

EP            1 187 023 A1    3/2002
(Continued)

OTHER PUBLICATIONS

European Search Report for EP 08 17 2293 dated May 26, 2009.

*Primary Examiner* — Khoa Huynh
(74) *Attorney, Agent, or Firm* — Knobbe Martens Olson & Bear LLP

(57) ABSTRACT

A cell, preferably a stand-alone device, arranged for wireless communication with a plurality of other cells in a communication network, e.g. a TDMA network such as a DECT based network. The cell includes a processor performing a selection algorithm which selects a reference cell among other cells. The selection algorithm bases the selection on a wireless signal, e.g. an RF signal, received from at least two other cells. Further, the cell includes a wireless receiver for receiving a first wireless signal, e.g. an RF signal, from the reference cell with time synchronization information for the reference cell. The cell includes a wireless transmitter which transmits time synchronization information for the cell itself represented in a second wireless signal, e.g. and RF signal. The selection algorithm selects the reference cell based on transmission link quality measurements and cell path information received from a number of cell candidates. The cell preferably also itself transmits cell path information, e.g. at regular intervals. Preferably, the cell can generate a random number and transmit it in wireless form as its cell identity code. A network of such cells can be self-configured, i.e. no manual action is required. Further, it allows changes in network topology, e.g. change of position of one or more cells, since each cell can automatically adapt to a new topology and select the most reliable reference cell to synchronize to.

15 Claims, 4 Drawing Sheets

(51) Int. Cl.
*H04L 12/24* (2006.01)
*H04W 84/20* (2009.01)
*H04W 84/18* (2009.01)

(56) References Cited

U.S. PATENT DOCUMENTS

2007/0201382 A1* 8/2007 Ekl et al. .................. 370/254

2008/0153493 A1* 6/2008 Salokannel et al. .......... 455/436

FOREIGN PATENT DOCUMENTS

| EP | 1187023 A1 * | 3/2002 |
| JP | 2002-164837 A | 6/2002 |
| JP | 2002-165269 A | 6/2002 |
| JP | 2005-322982 A | 11/2005 |

* cited by examiner

CELL FOR SELF-CONFIGURING WIRELESS COMMUNICATION NETWORK

CROSS REFERENCE TO RELATED APPLICATIONS

This application claims the benefit and priority to and is a U.S. National Phase Application of PCT International Application Number PCT/DK2009/050342, filed on Dec. 17, 2009, designating the United States of America and published in the English language, which is an International Application of and claims the benefit of priority to European Patent Application No. 08172293.6, filed on Dec. 19, 2008. The disclosures of the above-referenced applications are hereby expressly incorporated by reference in their entireties.

FIELD OF THE INVENTION

The invention relates to the field of wireless communication networks, such as Time Division Multiple Access (TDMA) based telecommunication networks that require time synchronization between cells, such as Radio Frequency telecommunication networks. More specifically, the invention provides a cell and a network of cells capable of self-configuration.

BACKGROUND OF THE INVENTION

When installing a Digital Enhanced Cordless Telecommunication (DECT) network with multiple cells (also called nodes) in order to provide wireless communication data coverage in a large area, it can be done using Wireless Relay Stations (WRS) cells, i.e. repeaters, or Radio Fixed Part cells, i.e. base stations. WRS cells are wirelessly connected to a base station which is then connected to receive and transmit external communication, while RFP cells are connected via a backbone wired network. In a DECT network it is necessary to time-synchronize such cells in order to allow the mobile terminals to roam and handover between the cells. It is also desirable to synchronize the cells in order to achieve higher system capacity.

For WRS cells it is necessary to do over-air-synchronization, and for RFP cells it is desirable to do over-air-synchronization in order to avoid special synchronization cabling in the backbone network. To form an over-air synchronized network, it is necessary to configure all the cells to build a suitable network topology. For WRS cells the synchronization path is the same as the duplex communication path back to the base station, which is an RFP cell with connectivity to a backbone network. Synchronization information from a master cell, e.g. a timing reference base station, can be relayed via cell paths including a multiple cells and geographically distributed in a star or chain pattern. Each cell in the network requires information of which of the other cells in the network to consider as a reference cell, i.e. which cell to synchronize to. In many cases several other cells are candidates as reference cells, and thus the most optimal one must be chosen for obtaining the best possible performance of the network.

For a large system with many cells it can be a cumbersome manual process to configure network topology and it has to be done by skilled personal using dedicated tools. All cells need to be supplied with information on which cell to consider as reference cell with respect to synchronization, and this process requires typically a substantial amount of consideration and measurements in order to configure the network for a reliable function with reliable synchronization between cells. If the network topology has to be changed, it also requires manual operation by skilled personal.

For applications where the network of cells are geographically fixed, a manual configuration may be acceptable. However, in many applications it is a problem that a complex manual re-configuration is required, in case some of the cells are physically moved, or in case the wireless transmission properties are changed between some of the cells of the network.

SUMMARY OF THE INVENTION

Thus, according to the above explanation, it is an object of the present invention to provide a cell and a network of cells capable of configuring itself to suit the actual topology of the distributed cells of the network.

According to a first aspect, the invention provides a cell arranged for wireless communication with a plurality of other cells according to claim 1, where the cell includes a processor arranged to perform a selection algorithm arranged to select a reference cell among the plurality of other cells based on a wireless signal received from at least two of the other cells.

With 'reference cell' is understood the one among other cells which the cell has selected as the one to synchronize to. E.g. in case the cell is a repeater cell, the cell will receive communication data from the reference cell in a synchronized manner, taking into account the received time synchronization information for the reference cell. Since the cell according to the first aspect is arranged to select which of a plurality of other cells to appoint a reference cell based on wireless signals received from two or more other cells, the cell does not need any manual action during setup. Thus, the cell is suited for automatic choice of reference cell when used in a network. Hereby, a network of such cells can organize themselves in an optimal star-chain topology given the physical location of the cells. This allows installation of the cells without the need for manual configuration of synchronization and communication paths. Skilled personal is not required for installation, and it allows unskilled consumers to install a wireless network with multiple cells. Further, no user interface means such as keyboard and/or display are required on the network cells, and thus the cells can be rather simple and thus able to manufacture in low cost versions.

As the selection is based on receipt of wireless signals from the other cells, it can be ensured that a proper wireless communication is actually achieved with the cell which is selected as reference cell, and thus the wireless communication link to the reference cell is verified to be reliably also for receipt of wireless communication data from the reference cell. This can not be ensured in a manual setup of reference cells, since transmission paths may have changed after the manual selection of reference cells until the network of cells is actually put into normal operation. Thus, a cell according to the first aspect is suited for a cell in networks where e.g. repeater cells are mobile, or at least in networks where the wireless transmission properties between cells changes dynamically. By continuously repeating the selection algorithm, the cell is capable of continuously, or at regular time intervals, repeating the selection algorithm to ensure that the reference cell currently selected is actually the most reliable reference cell to synchronize to. If suddenly another cell has proven more reliably as synchronization reference, then the cell can select this other cell as reference cell. In this way, the cell can always ensure that the selected reference cell will be reliable to synchronize to, also under operating conditions where the network topology changes dynamically. Thus, the cell is suited for networks that automatically adapts to removing of cells, relocating of cells and/or adding of cells.

Thus, the cell is highly suited as a repeater cell or base station cell in a wireless Radio Frequency network, e.g. a TDMA based network, such as a DECT network. In case all cells of such network have the properties as defined in the first aspect, then the entire network can configure itself without any manual selection of reference cells for all cells of the network. In the following cell embodiments of the first aspect will be described.

The cell is preferably a stand-alone unit, i.e. preferably including power supply or power source to deliver the necessary electric power to drive the wireless receiver and transmitter, the processor and possibly other additional power consuming circuits in the cell.

The selection algorithm is arranged to select the reference cell based on cell path information collected, such as in wireless form or via a wired backbone network, from at least two of the other cells. By 'cell path information' for a cell is understood information regarding a path between a timing reference base station and said cell. With such cell path information available from the other cells, the cell can select the reference cell taking into account the synchronization path or synchronization link of the cells being candidates as a reference cell. Thereby, the most synchronization reliable candidate can be selected. Especially, the cell path information may include at least data representing one of: 1) a physical length of a path of cells involved with the currently selected reference cell, 2) a number of cells involved in a path of cells with the currently selected reference cell, 3) a transmission link quality value for the selected reference cell, 4) an indication of a possible selection of a future reference cell, and 5) a list of cell identities involved in a path of cells with the currently selected reference cell. All such information can be used in determining reliability of cells with respect to being a potential reference cell. The physical length or number of synchronization hops are indicators of reliability of a cell with respect to synchronization, and thus with respect to the value of the cell as reference cell. Taking into account the fact that a cell may be about to select another reference cell itself, and cell ID of cells involved in the synchronization path of a cell, helps to avoid selecting a reference cell which could result in an undesired synchronization loop.

The cell may be arranged to perform round trip delay measurement on the communication path between the cell and a selected or a candidate reference cell. The cell can optionally compensate for the propagation delay (equal to ½ round trip delay) between the cells, in order to achieve correct synchronization between multiple cells.

The selection algorithm also selects the reference cell based on results of the transmission link quality measurements, such as signal strength, received timing jitter, a bit error rate, a frame error rate, round trip delays, comparison of signals received on multiple antennas, performed on wireless links between the cell and at least two other cells. The transmission link quality measurements may take place in the cell itself, and/or in the currently selected or candidate reference cell and the measurement result may be reported to the cell. The cell may be arranged to combine results from link quality measurements performed in the cell with link quality measurement results from reference or candidate cell. Taking into account such transmission link quality measurements, the actual wireless communication link to other cells can be taken into account in the selection of the reference cell, thus allowing the cell to function reliably in a network even under dynamic wireless transmission conditions. Preferably, the transmission link quality measurements result in numerical representations of results of the physical measurements.

The selection algorithm selects the reference cell based on a combination of results of transmission link quality measurements on wireless links to at least two other cells and collected cell path information from at least two other cells. Hereby, the selection algorithm can take into account a number of information facts and measurements and provide the selection of reference cells as an intelligent selection. Especially, the selection algorithm selects the reference cell based on a quality value calculated from a predetermined weighting function between results of the transmission link quality measurements and the cell path information. In this way the calculations involved may be rather limited in spite the fact that the reference cell selection is based on many parameters. More specifically, the selection algorithm selects the reference cell based on said quality value together with an evaluation of a possibility for establishing a synchronization loop. Hereby, the probability of creating a synchronization loop can be reduced, e.g. taking into account specific cell identity codes and information about cell being in the process of selecting a new reference cell.

The cell may be arranged to scan for wireless signals from other cells, e.g. to scan a plurality of carriers for wireless signals from other cells. Especially, the cell may perform such scan in idle time slots. Upon receipt of such wireless signals from other cells, the cell may apply the selection algorithm upon so as to select a new reference cell based on the received wireless signals and based on the wireless signal received from the currently selected reference cell. Especially, the selection algorithm may be based on a calculated quality parameter based on collected cell path information and performed transmission link measurements for each cell and a corresponding quality parameter calculated for the currently selected reference cell. Based thereon, the cell may select a new cell as reference cell, if this cell exhibits a better quality parameter.

Preferably, the cell is arranged to transmit, such as at regular time intervals, cell path information including information regarding a path between a timing reference base station and said cell represented in a wireless signal. The cell may be arranged to transmit cell path information via a wired backbone network. Hereby other cells receiving the information can use such cell path information in its choice of reference cell. Especially, the cell may include information received from the reference cell in such cell path information, such as information based on cell path information received from the reference cell. Further or alternatively, the cell path information may include data representing a result of a transmission link measurement performed on a wireless link between the cell and the reference cell. Further, data representing results of transmission link measurements performed on wireless links between the cell and one or more other cells may be included in the cell path information. By transmitting such cell path information, the cell improves the possibilities of other cells in evaluating the cell itself as a potential reference cell candidate.

The cell may be arranged to select an identity code as a random number and to transmit the identity code represented in a wireless signal, so as to identify the cell. With such cell identity being chosen in a random manner by the cell itself, the cell is further suited in a self-configuration network, since normally, the cells of a network are manually allocated identity codes. Preferably, the cell is arranged to transmit the identity code in a wireless signal along with additional data, such as along with communication data and/or cell path information data. The cell is preferably also arranged to receive wireless signals from other cells and to compare identity codes represented therein with the selected identity code. In case the cell receives an identity code from another cell which is identical with the selected identity code for itself, the cell is preferably arranged to repeat the process of selecting an identity code as a random number and to transmit this new identity code represented in a wireless signal. Hereby, a network of cells can handle the situation where two cells have, at random, selected the same identity code. The cell simply repeats selecting a new random identity code until it reaches an identity code not chose by other cells.

In one embodiment, the cell is arranged to receive a wireless signal from the reference cell with communication data represented therein, and wherein the cell is arranged to synchronize to said wireless signal from the reference cell according to the time synchronization information for the reference cell. Especially, the cell may be arranged to transmit a wireless signal with the communication data represented therein, i.e. the cell acting as a repeater cell. Alternatively, the cell may act as a base station cell and thus provide a communication data interface between a wireless communication network and a back-bone communication network, while being arranged to synchronize to other cell via wireless signals.

In preferred embodiments, the cell is arranged for wireless Radio Frequency communication with a plurality of other cells, and wherein the first and second wireless signals are wireless Radio Frequency signals. Further, it is to be understood that all of the above described embodiments may be arranged to transmit and receive all mentioned wireless signals in Radio Frequency wireless forms. Especially, the cell may be a cell arranged for DECT communication with other cells. In other embodiments, the cell is arranged for optical or acoustical communication with a plurality of other cells, i.e. where the first and second wireless signals are wireless optical or acoustical signals.

In a second aspect, the invention provides a device including a cell according to the first aspect. The device may especially be one of: a repeater, a base station device, and a user terminal. By a repeater is understood a cell which can receive wireless communication data from the reference cell and transmit the same communication data in wireless form and which can receive wireless communication data and transmit the same communication data in wireless form to the reference cell. By a base station is understood either a timing reference base station or a slave base station. The base station may communicate communication data via a wired back-bone network. By a user terminal is understood an end terminal with a user interface, e.g. a mobile terminal such as a cordless phone or a mobile phone.

In a third aspect, the invention provides a communication network including a plurality of cells according to the first aspect. In one embodiment, such network includes at least one cell being a base station cell, and at least one cell being a repeater cell. In another embodiment, the network includes a plurality of cells being base station cells. In still another embodiment, the communication network includes a plurality of cells being repeater cells. In a specific embodiment, the network includes one cell being a timing reference base station, a plurality of cells being repeater cells, and one or more cells being user terminals with user interfaces. In such network, communication data transmitted from the timing reference base station is relayed via one or more repeaters to the user terminal. Especially, the network may be a Time Division Multiple Access based network, such as a Digital Enhanced Cordless Telephone network, a Bluetooth network, a WiMAX network, a Global System for Mobile communication network, a Universal Mobile Telecommunications System network, a Long Term Evolution network, a Zigbee network, or a WiFi network.

It is appreciated that any advantage mentioned for the first aspect applies as well for the second and third aspects. Further, any sub aspect mentioned in connection with the first aspect may in any way be combined with the second and/or third aspects.

BRIEF DESCRIPTION OF DRAWINGS

In the following, the invention will be described in more details by referring to embodiments illustrated in the accompanying drawings, of which

DETAILED DESCRIPTION OF THE INVENTION

Figure 1:
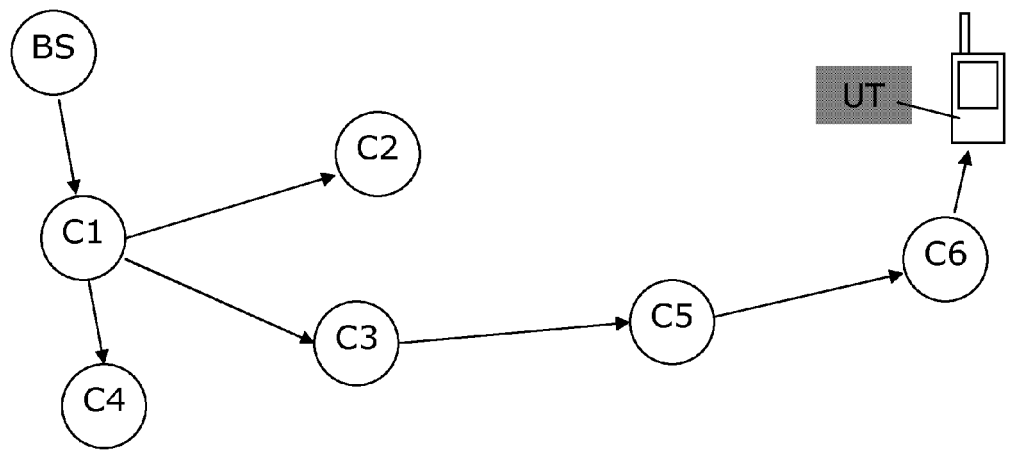
FIG. 1 illustrates a communication network topology communication path from a timing reference base station, via time synchronized repeater cells to an end terminal.

FIG. 1 illustrates a topology of a communication network with wireless communication between a timing reference base station BS, repeater cells C1, C2, C3, C4, C5, C6 time synchronized in a path indicated by the arrows. A user terminal UT forms the final destination of communication data from the base station BS, via repeater cells C1, C3, C5, and C6. Each cell C1-C6 has selected a reference cell to time synchronize to. In the illustrated example in FIG. 1, C1 is seen to have the timing reference base station BS as reference cell, C3 has C1 as reference cell, C5 has C3 as reference cell, and finally the user terminal UT has C6 as reference cell. All cells BS, C1-C6 transmit synchronization code in wireless form which enables other cells to time synchronize to communication data received from the cell.

According to the invention, the cells are arranged to automatically select which of the other cells within wireless coverage to use as reference cell. In contrast, prior art network cells require manual selection of reference cell. Further, in prior art networks the network cells have predetermined manually configured identity codes so as to uniquely identify all cells in the network. E.g. in DECT networks, a network identity code consists of 32 or 37 bits, a cell identity code consists of 8 or 3 bits, while the combined network and cell identity code always consists of 40 bits. According to a preferred embodiment, the cells C1-C6 can automatically select their own cell identity code, namely by selecting a random number code. Thus, manual assignment of cell identity codes is eliminated. In case a cell receives a wireless signal from another cell which has selected the same identity code, the cell will preferably select another random number.

Figure 2:
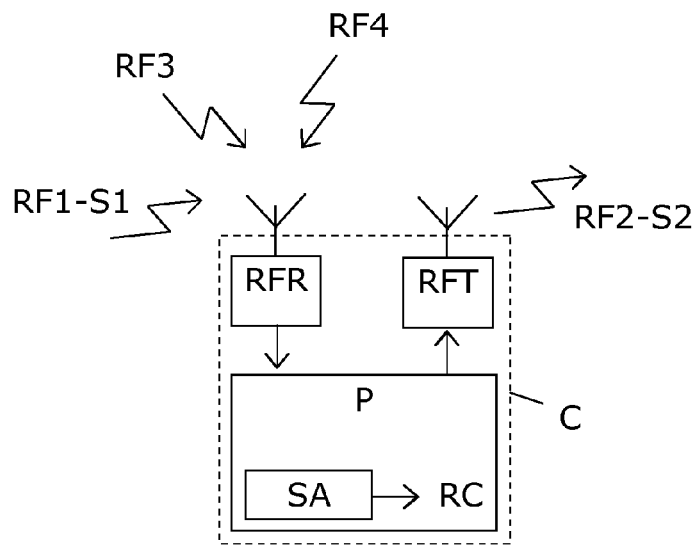
FIG. 2 illustrates a cell embodiment arranged for wireless communication with other cells and for automatic selection of a timing reference cell based on received RF signals from other cells.

FIG. 2 illustrates a diagram form of a cell C embodiment. The cell includes an RF receiver RFR, an RF transmitter RFT, and a processor P which can execute, among other processes, a selection algorithm SA arranged to take into account information from received wireless RF signals RF1-S1, RF3, RF4 from other cells and select one of the other cells as reference cell RC, based thereon. Timing synchronization information 51 is received in wireless RF form RF1-S1 from the cell which has been selected as reference cell RC. The cell C can then receive communication represented in RF form from the reference cell RC, synchronizing to the RF signal from the reference cell RC using the received timing synchronization information 51.

The cell C transmits a second RF signal RF2-S2 with timing synchronization information S2 allowing other cells to synchronize to RF signals from the cell C. If the cell C is configured as a repeater cell, the cell C transmits communication data received from the reference cell RC in wireless RF form via the RF transmitter RFT.

Figure 3:
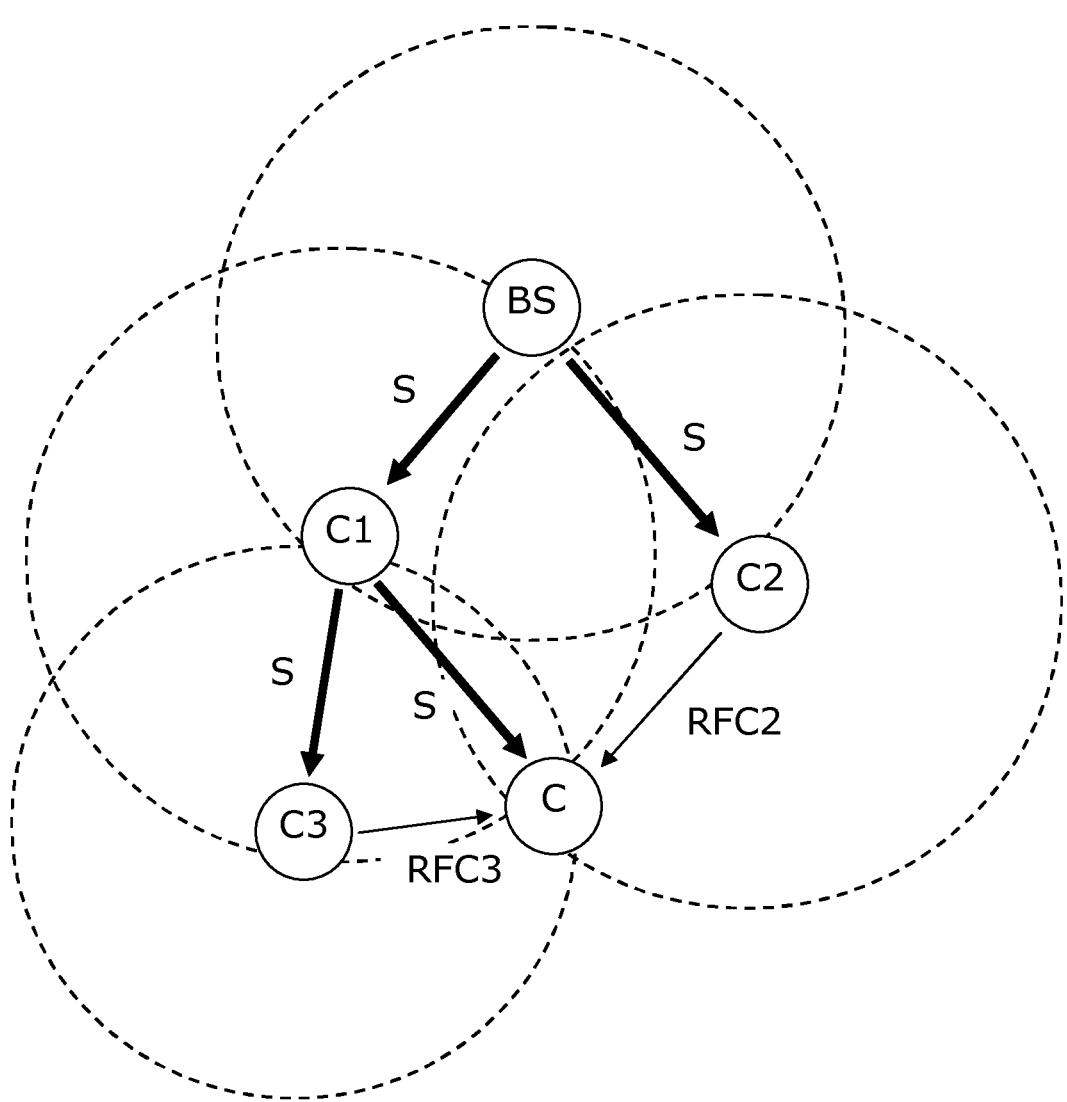
FIG. 3 illustrates an example of a cell in a network topology where several other cells are candidates as timing reference cell.

FIG. 3 illustrates an example of a cell C in a network topology where several other cells C1, C2, C3 are candidates as timing reference cell. A timing reference base station BS transmits synchronization information S in wireless form. Wireless coverage is illustrated with dashed circles, and thus it is seen that wireless signals transmitted from the base station BS reach cells C1 and C2. Wireless signals from C1 can reach cell C as well as cell C3. As seen, cell C can receive wireless signals from all of cells C1, C2, and C3. Currently, the cell C has received timing synchronization information from C1 since C1 is currently selected as reference cell. However, during scanning, respective wireless signals RFC2 and RFC3 have been received by cell C, and thus the cell C performs its selection algorithm in order to determine if the currently selected reference cell C1 should be replaced by either C2 or C3, or if C1 should remain the reference cell. The selection algorithm in the cell C selects the reference cell based on transmission link quality measurements performed on respective wireless signals RFC2 and RFC3 as well as cell path information from the cells C2, C3 being alternative reference cell candidates. By cell path information for a cell is understood information about the synchronization path for the cell, e.g. including a hop count value in the form of how many cells are involved in the synchronization path between the timing reference base station BS and the cell itself. Such cell path information is used as basis for the selection of reference cell, preferably together with measures of transmission link quality, e.g. including signal strength, for the wireless connection to the cell. A cell identity code for the cell is preferably also included in all wireless transmitted signals, in order for receiving cells to be able to identify the transmitter cell.

Preferably, all cells in a network transmit updated cell path information in a wireless format or via wired backbone network, such as at regular time intervals, thereby allowing other cells to use such data for evaluating the cell as a reference cell candidate. Also timing synchronization information is preferably transmitted from all cells in order for other cells to synchronize to wireless signals from the cell, if other cells has selected the cell as reference cell.

Figure 4:
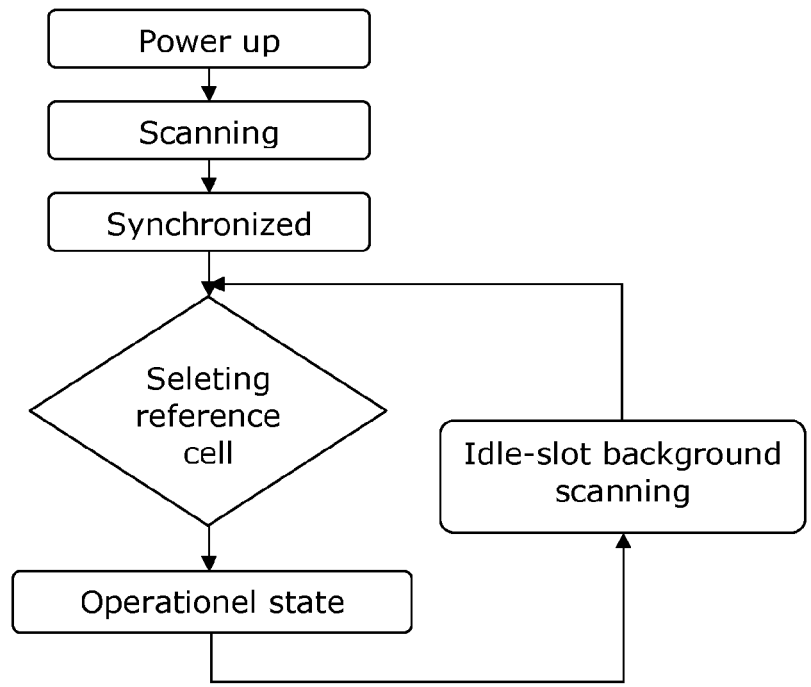
FIG. 4 illustrates an example of an overall functional diagram of the cell arranged for automatic reference cell selection.

FIG. 4 illustrates an example of an overall function of a cell. After power up, the cell starts scanning for incoming wireless signals from other cells in the network to which the cell belongs, e.g. by scanning at several RF carriers. After receipt of a suitable signal, synchronization information in a wireless form from the cell is received, and the cell enters into a synchronized state. In this state is collects cell path information and performs transmission link quality measurements and, the cell runs its reference cell selection algorithm for the first time and selects a reference cell to synchronize to among the transmitters of received wireless signals. The cell may use a preloaded, previously used or randomly selected cell identity code, and then the cell enters operational state, i.e. a normal data communication mode. In the operational state, the cell broadcasts network required timing synchronization information as well as cell path information. In idle time slots, the cell scans again for incoming wireless signals form other cells and repeats the reference cell selection algorithm with the latest incoming wireless signals as basis, and possibly the selection algorithm selects another cell as reference cell, if the algorithm reveals that a better candidate has come up.

Figure 5:
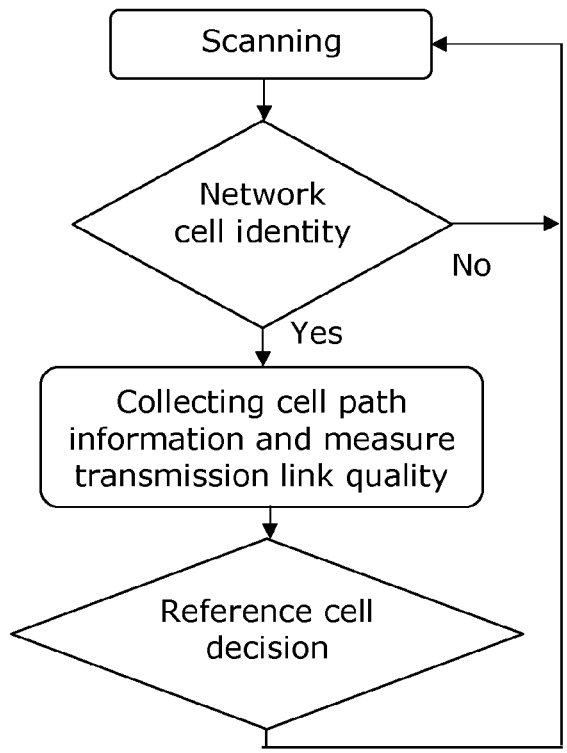
FIG. 5 illustrates an example of a functional diagram of a cell arranged to scan for incoming wireless signals from other cells which may be candidates to select as reference cell.

FIG. 5 illustrates another example of an overall functional diagram for a cell. Initially, the cell starts scanning for incoming wireless signals. If a signal is received with a network identity different from the cell itself, the scanning is repeated until the cell receives a signal from a cell belonging to its own network.

The cell then collects cell path information and measures transmission link quality for signals from incoming signals from one or more other cells in the network. Based on a combination of the cell path information and transmission link quality measurements, the cell decides which cell to select as reference cell.

Figure 6:
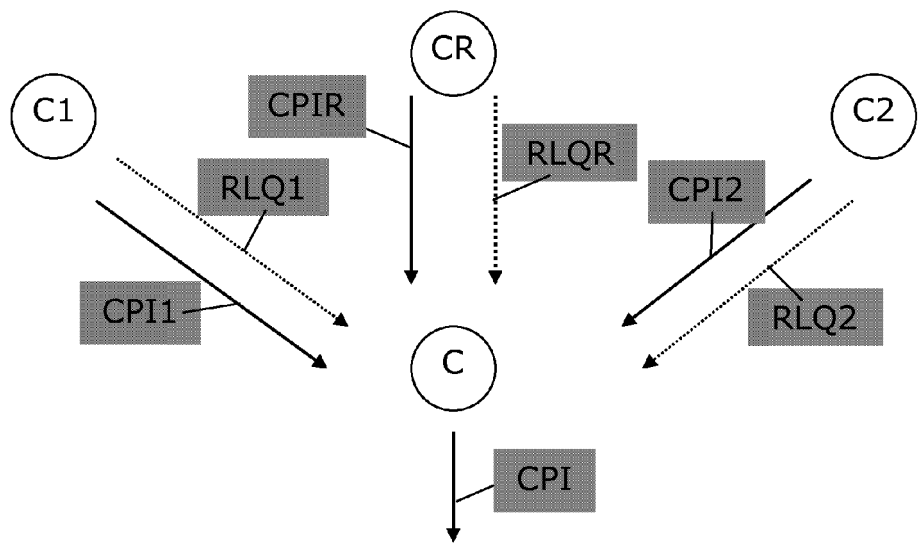
FIG. 6 illustrates a preferred wireless information from other cells which forms the basis for decision of which cell to select as reference cell.

FIG. 6 illustrates a scenario where a cell C can receive wireless signals from three other cells: C1, C2 and the currently selected reference cell CR. The cell collects cell path information CPI1, CPI2, CPIR from all three cells C1, C2, CR, and performs transmission link quality measurements RLQ1, RLQ2, RLQR on wireless signals from the cells C1, C2, CR. Based on a combination, preferably a weighted combination, of measured transmission link quality and cell path information the cell C selects the most reliable one of the cells C1, C2, CR as reference cell. Especially, the transmission link quality measurements can be performed on the wireless signal in which the cell path information is received, and thus time to collect the basis for the reference cell algorithm can be reduced to a minimum.

To allow other cells to evaluate the cell as reference cell candidate, the cell itself transmits a wireless signal with relevant cell path information represented therein. Thus, altogether in preferred embodiments, at the following algorithms are implemented for execution by the processor in the cell:

1. Calculation of cell path information to be transmitted by the cell. The calculation is based on at least the following input information:
    a. Cell path information from the currently selected reference cell
    b. Transmission link quality information from the currently selected reference cell
2. Reference cell selection algorithm. When information from other cells (i.e. reference cell candidates) are captured (or at regular interval) this algorithm is performed. If another candidate cell is evaluated to be better then current reference cell, a cell will switch to this as reference cell. The selection algorithm must also ensure that isolated synchronization loops are not created (avoid switching to a child-cell). Input information in the decision algorithm includes:
    a. Cell path information from reference cell
    b. Transmission link quality information from reference cell c. Cell path information from candidate cell d. Transmission link quality information from candidate cell When a reference cell has been selected, the round-trip delay can be measured between the cell and the reference cell. The cell can optionally compensate for a propagation delay (equal to ½ round trip delay) between the cells, in order to achieve correct synchronization through-out a large network with cells linked in multiple levels.

In the following a detailed example of a reference cell selection algorithm is described. Numerical values for the following parameters are calculated:

WirelessLinkQuality: Transmission link quality value from cell.

PathIdList: Cell path identity list, extracted from CellPathInfo.

PathSelectionState: Path selection state information, extracted from CellPathInfo.

HopCount: Number of cells in the path from the timing reference basestation, extracted from CellPathInfo.

CellPathInfo: Consists of PathQuality, PathIdList, PathSelectionState, HopCount.

The algorithm preferably uses the following internal variables and constants:

PathQuality: Internal path quality information value for received cell signal WeightedSelectionValue: Selection value; the cell presenting lowest value is to be selected
HOP_PENALTY: Algorithm constant
QUALITY_CEELING: Algorithm constant
SelectionState: Internal state variable indicating selection in progress in cell (cell itself)
CellId:Identity of cell that is performing the algorithm (cell itself)

The cell path information CellPathInfo may be any combination of PathQuality, PathIdList, PathSelection and HopCount.

The formula for calculation of a path quality value for each received signal may be:

PathQuality:=max(0,QUALITY_CEELING−WirelessLinkQuality(received))+PathQuality(received)

The cell preferably transmits CellPathInfo which may be a set of following elements derived from information received from reference cell:
PathQuality(tx):=PathQuality(ref)
PathIdList(tx):=PathIdList(ref)+CellId
PathSelection(tx):=PathSelection(ref)+SelectionState
HopCount(tx):=HopCount(ref)+1

A selection value can be calculated using one of alternative weighting methods. Such a method can be one of these for cell (i):
Option 1:
WeightedSelectionValue(i):=PathQuality(i)+HopCount(i)*HOP_PENALTY
Option 2:
WeightedSelectionValue(i):=Table1[PathQuality(i)]+Table2[HopCount(i)]
Option 3:
WeightedSelectionValue(i):=Table3[PathQuality(i), HopCount(i)]

Here, Table1 and Table2 are one-dimensional weighting tables and Table3 is a two-dimensional weighting table. These weighting tables are preferably designed specifically to suit the specific types of network cell and network applications and can not be described generally.

Finally, the reference cell selection decision may be based on the following decision scheme:
Select a candidate cell (i) as new reference cell
  if the WeightedSelectionValue(i) is lower than the currently used reference cell including a threshold value, and
  if PathIdList(i) does not contain representation of current CellId, and
  if PathSelectionState(i) does not indicate selection in progress.

These final "if" statements serve to take into account possible undesired synchronization loops which may result from the selection of a cell as reference cell, since such synchronization loop renders a cell a bad choice as reference cell, in spite the cell exhibits a high WeightedSelectionValue.

Figure 7:
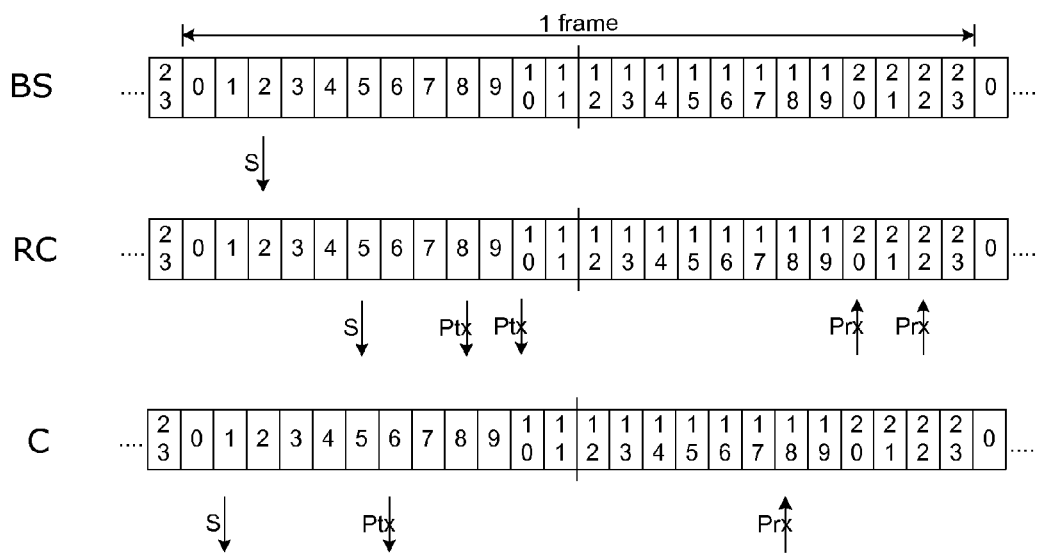
FIG. 7 illustrates an example of usage of time slots in a TDMA network.

FIG. 7 illustrates an example of a preferred scheme for usage of time slots in a network including a timing reference base station BS, a reference cell RC and the cell C itself. S indicates synchronization signals, Ptx indicate payload transmission, Prx indicated payload reception. Synchronization and transmitted payload may be combined in a time slot. The time slots are grouped into frames, here illustrated as one frame including 24 time slots, of which the first 12 time slots are primarily used for downlink transmission from network towards end-terminal cells, and the last 12 time slots are primarily used for uplink reception from end-terminals. A cell C may receive synchronization and cell path information from multiple cells, including reference cell RC and timing reference base station BS.

Specific examples of products based on the cell according to the invention are: 1) a DECT repeater and 2) a DECT base station with Internet Protocol interface such as Ethernet, which is able to synchronize to DECT signals received in wireless form from other base stations. However, it is to be understood that the cell according to the first aspect is applicable within a larger variety of products, especially products which are intended to form part of a wireless communication network, such as a wireless RF communication network.

To sum up, the invention provides a cell, preferably a stand-alone device, arranged for wireless communication with a plurality of other cells in a communication network, e.g. a TDMA network such as a DECT based network. The cell includes a processor performing a selection algorithm which selects a reference cell among other cells. The selection algorithm bases the selection on a wireless signal, e.g. an RF signal, received from at least two other cells. Further, the cell includes a wireless receiver for receiving a first wireless signal, e.g. an RF signal, from the reference cell with time synchronization information for the reference cell. The cell includes a wireless transmitter which transmits time synchronization information for the cell itself represented in a second wireless signal, e.g. and RF signal. The selection algorithm selects the reference cell based on transmission link quality measurements and cell path information received from a number of cell candidates. The cell preferably also itself transmits cell path information, e.g. at regular intervals. Preferably, the cell can generate a random number and transmit it in wireless form as its cell identity code. A network of such cells can be self-configured, i.e. no manual action is required. Further, it allows changes in network topology, e.g. change of position of one or more cells, since each cell can automatically adapt to a new topology and select the most reliable reference cell to synchronize to.

Although the present invention has been described in connection with the specified embodiments, it is not intended to be limited to the specific form set forth herein. Rather, the scope of the present invention is limited only by the accompanying claims. In the claims, the term "comprising" or "including" does not exclude the presence of other elements. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A cell unit for wireless communication with a plurality of other cell units, the cell unit comprising:
a processor configured to perform a selection algorithm configured to select a reference cell unit among the plurality of other cell units based on a wireless signal received from at least two of the other cell units, wherein the selection algorithm is configured to select the reference cell unit based on cell path information collected from the at least two of the other cell units, the cell path information for a cell unit including information regarding a path between a timing reference base station and said cell unit, and wherein the selection algorithm selects a combination of results of transmission link quality measurements performed on wireless links between the cell unit and the at least two other cell units and the collected cell path information,
a wireless receiver configured to receive a first wireless signal from the reference cell unit with time synchronization information for the reference cell unit represented therein, the reference cell unit being one among the other cell units which the cell unit has selected as the one to synchronize to, and
a wireless transmitter configured to transmit a second wireless signal with time synchronization information for the cell unit represented therein.

2. The cell unit according to claim 1, wherein the cell path information includes at least data representing one of: a physical length of a path of cell units involved with the currently selected reference cell unit, a number of cell units involved in a path of cell units with the currently selected reference cell unit, a transmission link quality value for the selected reference cell unit, an indication of a possible selection of a future reference cell unit, and a list of cell unit identities involved in a path of cell units with the currently selected reference cell unit.

3. The cell unit according to claim 1, wherein the selection algorithm is further configured to select the reference cell unit based on results of transmission link quality measurements performed on wireless links between the cell unit and at least two other cell units.

4. The cell unit according to claim 3, wherein the transmission link quality measurements include at least measurement of one of: transmission signal strength, received timing jitter, a bit error rate, a frame error rate, round trip delays, or comparison of signals received on multiple antennas.

5. The cell unit according to claim 1, wherein the selection algorithm is further configured to select the reference cell unit based on a quality value calculated from a predetermined weighting function between results of the transmission link quality measurements and the cell path information.

6. The cell unit according to claim 5, wherein the selection algorithm is further configured to select the reference cell unit based on said quality value together with an evaluation of a possibility for establishing a synchronization loop.

7. The cell unit according to claim 1, wherein the processor further configured to scan for wireless signals from the other cell units.

8. The cell unit according to claim 7, wherein the processor is further configured to apply the selection algorithm upon receipt of wireless signals from the other cell units, so as to select a new reference cell unit based on the received wireless signals and based on the wireless signal received from the currently selected reference cell unit.

9. The cell unit according to claim 1, wherein the wireless transmitter is further configured to transmit cell path information including information regarding a path between a timing reference base station and said cell unit represented in a wireless signal.

10. The cell unit according to claim 1, wherein the processor is further configured to select an identity code as a random number and wherein the wireless transmitter is further configured to transmit the identity code represented in a wireless signal so as to identify the cell unit.

11. The cell unit according to claim 10, wherein the wireless receiver is further configured to receive wireless signals from the other cell units and to compare identity codes represented therein with the selected identity code, and in case the cell unit receives an identity code from one of the at least two other cell units, which is identical with the selected identity code, the cell unit is configured to repeat the process of selecting an identity code as a random number and the wireless transmitter is further configured to transmit this identity code represented in a wireless signal.

12. The cell unit according to claim 1, wherein the wireless receiver is configured to receive a wireless signal from the reference cell unit with communication data represented therein, and wherein the cell unit is configured to synchronize to said wireless signal from the reference cell unit according to the time synchronization information for the reference cell unit.

13. The cell unit according to claim 1, wherein the cell unit is configured for wireless Radio Frequency communication with the other cell units, and wherein the first and second wireless signals are wireless Radio Frequency signals.

14. The cell unit according to claim 1, wherein the cell unit is one of: a repeater, a base station device, or a user terminal.

15. A communication network including a plurality of cell units according to claim 1.

* * * * *

UNITED STATES PATENT AND TRADEMARK OFFICE
CERTIFICATE OF CORRECTION

PATENT NO. : 8,958,338 B2  
APPLICATION NO. : 13/139597  
DATED : February 17, 2015  
INVENTOR(S) : Morten Laursen et al.

Page 1 of 1

It is certified that error appears in the above-identified patent and that said Letters Patent is hereby corrected as shown below:

In the drawings

Sheet 3 of 4 (Fig. 4) at line 4 (approx.), Change "Seleting" to --Selecting--.

Sheet 3 of 4 (Fig. 4) at line 7, Change "Operationel" to --Operational--.

In the specification

In column 2 at lines 20-23, Delete "a processor arranged....the other cells." and insert the same on Col. 2, Line 19, after "includes" as a continuation of the same paragraph.

In column 7 at line 10, Change "51" to --S1--.

In column 7 at line 15, Change "51." to --S1.--.

In column 8 at line 12 (approx.), Change "form" to --from--.

In column 8 at line 59, Change "then" to --than--.

Signed and Sealed this  
Eighth Day of December, 2015

Michelle K. Lee  
*Director of the United States Patent and Trademark Office*